United States Patent
Murakami et al.

(10) Patent No.: US 8,256,326 B2
(45) Date of Patent: Sep. 4, 2012

(54) AUTOMATIC TRANSMISSION CONTROL UNIT AND AUTOMATIC TRANSMISSION INCLUDING THE SAME

(75) Inventors: Naotaka Murakami, Anjo (JP); Kenji Suzuki, Anjo (JP); Jun Takamatsu, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 456 days.

(21) Appl. No.: 12/438,409

(22) PCT Filed: Nov. 22, 2007

(86) PCT No.: PCT/JP2007/072642
§ 371 (c)(1),
(2), (4) Date: Feb. 23, 2009

(87) PCT Pub. No.: WO2008/062865
PCT Pub. Date: May 29, 2008

(65) Prior Publication Data
US 2010/0229677 A1   Sep. 16, 2010

(30) Foreign Application Priority Data
Nov. 24, 2006  (JP) ................................. 2006-317395

(51) Int. Cl.
*F16H 57/02* (2012.01)

(52) U.S. Cl. .................................................. 74/606 R

(58) Field of Classification Search ................. 74/606 R
See application file for complete search history.

(56) References Cited

U.S. PATENT DOCUMENTS

| 4,693,141 A | * | 9/1987 | Iwanaga | 74/606 R |
| 5,637,007 A | * | 6/1997 | Suzuki et al. | 439/276 |
| 5,823,070 A | * | 10/1998 | Taniguchi et al. | 74/606 R |
| 6,290,537 B1 | * | 9/2001 | Sommer | 439/559 |

(Continued)

FOREIGN PATENT DOCUMENTS

JP        04-092459 A        3/1992

(Continued)

OTHER PUBLICATIONS

Partial Translation of Japanese Office Action issued on Oct. 18, 2011, in corresponding Japanese Patent Application No. 2009-80101345.3.

*Primary Examiner* — Vicky Johnson
(74) *Attorney, Agent, or Firm* — Sughrue Mion, PLLC

(57) ABSTRACT

A control unit that is not subjected to any external force except its own weight until completion of assembly, and is easily mounted to an automatic transmission. A connector facing an inside connector provided inside an automatic transmission is provided at a lower end of a unit main body, and another connecter exposed to the outside of the automatic transmission is provided at an upper end of the unit main body. The unit main body includes a control device such as a microcomputer for controlling the automatic transmission. The unit main body is guided by a moving-side guide portion formed in a lower part thereof and protrusions provided as a fixing-side guide portion, thereby connecting the lower end connecter to the connector. The automatic transmission and the unit main body are sealed by a flange and a packing of a sealing mechanism portion. The flange covers from above a through hole for inserting the unit main body of the automatic transmission therein.

14 Claims, 6 Drawing Sheets

U.S. PATENT DOCUMENTS

2006/0219050 A1 * 10/2006 Morise et al. ............... 74/606 R

FOREIGN PATENT DOCUMENTS

| JP | 11-257483 A | 9/1999 |
| JP | 2000-164287 A | 6/2000 |
| JP | 2000-353569 A | 12/2000 |
| JP | 2002-250430 A | 9/2002 |
| JP | 2002-346065 A | 12/2002 |
| JP | 2003-100380 A | 4/2003 |
| JP | 2004-199961 A | 7/2004 |
| JP | 2005-178474 A | 7/2005 |
| JP | 2006-250321 A | 9/2006 |
| JP | 2007-100795 A | 4/2007 |

* cited by examiner

AUTOMATIC TRANSMISSION CONTROL UNIT AND AUTOMATIC TRANSMISSION INCLUDING THE SAME

CROSS-REFERENCE TO RELATED APPLICATION

The disclosure of Japanese Patent Application No. 2006-317395 filed on Nov. 24, 2008, including the specification, drawings and abstract is incorporated herein by reference in its entirety.

BACKGROUND OF THE INVENTION

1. Field of the Invention

The present invention generally relates to an automatic transmission control unit and an automatic transmission including the control unit. More particularly, the present invention relates to an automatic transmission control unit, which is a structure for attaching the control unit to an automatic transmission, and an automatic transmission including the control unit.

2. Description of the Related Art

An example of a conventional automatic transmission control device is disclosed in Japanese Patent Application Publication No. H11-257483, which discloses mounting a control device of an automatic transmission in an automatic transmission case.

More specifically, the control device is mounted in an oil pan. The control device thus mounted in the automatic transmission case is located near a hydraulic control device. The length of signal wires between the control device and the hydraulic control device can therefore be reduced, enabling reduction in cost. However, it is necessary to disassemble the automatic transmission case to replace the control unit, and the maintenance work is therefore troublesome.

Japanese Patent Application Publication No. 2006-250321 discloses an invention that solves the problem. Japanese Patent Application Publication No. 2006-250321 describes an automatic transmission control device including an automatic transmission case having a through hole, a connector fitting in the through hole, and a control device accommodated in the connector and disposed in the automatic transmission case. The control device can therefore be replaced by removing the connector from the through hole and replacing the connector itself. It is not necessary to disassemble the automatic transmission case as in the conventional example, thereby making replacement of the control device easier.

In the technology of Japanese Patent Application Publication No. 2006-250321, however, the control device is mounted in a connector case, and wires are formed integrally at an upper end of the connector case. It is therefore necessary to replace a non-defective wire harness to replace the control device.

SUMMARY OF THE INVENTION

The present invention is devised to solve the above problems and it is an object of the present invention to provide an automatic transmission control unit capable of being easily mounted to an automatic transmission and to provide an automatic transmission control unit capable of preventing increase in cost for replacement, and an automatic transmission including the control unit.

In an automatic transmission control unit according to a first aspect, a first connecter and a second connecter are attached to a unit main body including a control unit for controlling an automatic transmission. The first connecter is connected to an electronic equipment inside an automatic transmission case and is connected to an inside connecter provided inside the automatic transmission case. The second connecter is exposed to outside of the automatic transmission case and is connected to an electronic equipment of a control system, such as an engine, provided outside the automatic transmission case. At least a part of the automatic transmission control unit is inserted into a through hole formed in the automatic transmission case, and the automatic transmission control unit and the automatic transmission case are sealed by a sealing mechanism portion.

The phrase "inside the automatic transmission case" indicates a space surrounded by a housing of a torque converter and a housing of a speed change mechanism and a space surrounded by an oil pan and the like. The unit main body may have any structure as long as the unit main body is a housing body made of aluminum, a synthetic resin, or the like and the unit main body includes an electronic control device such as a microcomputer required to control the automatic transmission and includes a control device formed by an electronic circuit for performing signal transmission between the electronic control device and other sensors and actuators. The sealing mechanism portion may have any structure as long as the sealing mechanism portion covers from above the through hole of the automatic transmission or seals from the side. Preferably, the unit main body is mounted to the automatic transmission case so that no relative external force is applied between the automatic transmission case and the unit main body.

In the automatic transmission control unit according to a second aspect, the unit main body has a moving-side guide portion formed in a lower part of the unit main body. The moving-side guide portion is guided by a fixed-side guide portion provided inside the automatic transmission case and guides the first connecter to the connecter provided inside the automatic transmission case so that the first connecter can be connected to the connecter.

Preferably, for example, one of the fixed-side guide portion and the moving-side guide portion is a protruding portion and the other is an approximately Y-shaped opening. The fixed-side guide portion and the moving-side guide portion may have any structure as long as the protruding portion is connected deeply into the approximately V-shaped opening by insertion of the unit main body, and looseness in the horizontal direction is regulated by the linear part of the approximately Y-shaped opening, and the connecter provided inside the automatic transmission case and the first connecter to be connected to the connecter can be connected.

In the automatic transmission control unit according to a third aspect, one of the fixed-side guide portion and the moving-side guide portion is a protruding portion, the other is an approximately Y-shaped opening. By insertion of the unit main body, the protruding portion is connected deeply into the approximately V-shaped opening, and looseness in a horizontal direction is regulated by a linear portion of the approximately Y-shaped opening.

The fixed-side guide portion and the moving-side guide portion may have any structure as long as looseness in the horizontal direction can be regulated by deeply connecting the fixed-side guide portion and the moving-side guide portion, and the fixed-side guide portion and the moving-side guide portion can eventually cause connection between the connecter provided inside the automatic transmission case and the first connecter of the unit main body to be connected to the connecter.

In the automatic transmission control unit according to a fourth aspect, one of the fixed-side guide portion and the moving-side guide portion is a protruding portion, the other is an approximately Y-shaped opening. By insertion of the unit main body, the protruding portion is connected deeply into the approximately V-shaped opening, looseness in a horizontal direction is regulated by a linear portion of the approximately Y-shaped opening, and positioning that enables connection of the connecter provided inside the automatic transmission case and the first connecter to be connected to the connecter is performed. In other words, the fixed-side guide portion and the moving-side guide portion are auxiliary units for connecting the connecter provided inside the automatic transmission case and the first connecter to be connected to that connecter to each other. The fixed-side guide portion and the moving-side guide portion can therefore have any structure as long as they can regulate looseness in the horizontal direction by insertion of the unit main body and thus can accurately connect the connecter provided inside the automatic transmission and the first connecter to be connected to that connecter to each other.

In the automatic transmission control unit according to a fifth aspect, the sealing mechanism portion presses a packing by a flange provided in the unit main body. The flange provided on the unit main body may have any structure as long as the unit main body and the flange are formed integrally. The unit main body and the flange are not necessarily be made of the same material. A part of the unit main body may be insert-molded into the flange.

In the automatic transmission control unit according to a sixth aspect, the sealing mechanism portion presses a packing by a lid body provided as a separate member from the unit main body. In the case where the flange provided in the unit main body is not formed integrally with the unit main body, the sealing property can be ensured by another member.

In the automatic transmission control unit according to a seventh aspect, one of the first connecter connecting to the connecter provided inside the automatic transmission case and the connecter provided inside the automatic transmission case has a partition wall for insulating connecter male terminals or connecter female terminals of the one connecter from each other, and the other connecter has insertion recesses between connecter female terminals or connecter male terminals of the other connecter so that the partition wall can be inserted into the insertion recesses. For example, one connecter may have a partition wall for insulating connecter male terminals from each other, and the other connecter may have insertion recesses provided between connecter female terminals to insert the partition wall therein. The partition wall may have a grid shape or may have a cut in a part of the side that is less bendable. However, the partition wall preferably has a grid shape on the connecter male terminal side or the connecter female terminal side.

In the automatic transmission control unit according to an eighth aspect, the partition wall and the insertion recesses regulate an insertion direction in an early stage of relative connection between the partition wall and the insertion recesses, and the insertion regulation is removed when connection between the connecter female terminals and the connecter male terminals is started. The partition wall and the insertion recesses may have any structure as long as the partition wall and the insertion recesses can accurately connect the connecter provided in the oil inside the automatic transmission to the opposing connecter and can prevent adjacent connecter female terminals or adjacent connecter male terminals from contacting each other even if the connecter female terminals or the connecter male terminals are broken by insertion of the unit main body.

In the automatic transmission control unit according to a ninth aspect, the unit main body has a breather hole in the flange for communicating the inside of the automatic transmission case with the outside of the automatic transmission case. The breather hole may have any structure as long as the breather hole allows communication between the inside and outside of the automatic transmission case, prevents dust and the like from entering the automatic transmission case, and performs pressure adjustment according to a change in volume of the automatic transmission case.

In an automatic transmission according to a tenth aspect includes a speed change mechanism accommodated inside the automatic transmission case, a hydraulic circuit for driving the speed change mechanism, various electronic equipments for controlling a flow of an oil pressure of the hydraulic circuit, and the automatic transmission control unit according to any one of the first aspect to the ninth aspect. The speed change mechanism accommodated inside the automatic transmission case, the hydraulic circuit for driving the speed change mechanism, and the various electronic equipments for controlling a flow of an oil pressure of the hydraulic circuit may have known structures. The automatic transmission includes the automatic transmission control unit according to any one of the first aspect to ninth aspect as a required component.

An automatic transmission control unit according to the first aspect, a first connecter and a second connecter are attached to a unit main body including a control unit for controlling an automatic transmission. The first connecter is connected to an electronic equipment inside an automatic transmission case and is connected to a connecter provided inside the automatic transmission case. The second connecter is exposed to outside of the automatic transmission case and is connected to an electronic equipment provided outside the automatic transmission. At least a part of the automatic transmission control unit is inserted into a through hole formed in the automatic transmission case, and the automatic transmission control unit and the automatic transmission case are sealed by a sealing mechanism portion.

Accordingly, the connecter connected to, for example, another engine control system and exposed to the outside of the automatic transmission is provided at the upper end of the unit main body. Since wires are not integrally formed in the unit main body, it is not necessary to replace a non-defective wire harness to replace the control device In the automatic transmission control unit according to the second aspect, the unit main body has a moving-side guide portion formed in a lower part of the unit main body, and the moving-side guide portion is guided by a fixed-side guide portion provided inside the automatic transmission case and guides the first connecter to the connecter provided inside the automatic transmission case so that the first connecter can be connected to the connecter. The moving-side guide portion formed in the lower part of the unit main body is guided by the fixed-side guide portion provided in the oil inside the automatic transmission, whereby the connecter at the lower end of the unit main body is connected to the connecter provided inside the automatic transmission. Accordingly, in addition to the effect described in the first aspect, displacement between the connectors in the direction perpendicular to a length direction is eliminated, thereby facilitating accurate mounting of the unit main body.

In the automatic transmission control unit according to the third aspect, one of the fixed-side guide portion and the moving-side guide portion of the unit main body is a protruding portion, the other is an approximately Y-shaped opening. By insertion of the unit main body, the protruding portion is connected deeply into the approximately Y-shaped opening, and looseness in a horizontal direction is regulated by a linear portion of the approximately Y-shaped opening. In the linear part of the approximately Y-shape, the protruding portion fits in the opening without looseness. Accordingly, in addition to the effect described in the second aspect, displacement between the connectors in the direction perpendicular to a length direction is therefore eliminated, thereby facilitating accurate mounting of the unit main body.

In the automatic transmission control unit according to the fourth aspect, one of the fixed-side guide portion and the moving-side guide portion is a protruding portion, the other is an approximately Y-shaped opening. By insertion of the unit main body, the protruding portion is connected deeply into the approximately Y-shaped opening, looseness in a horizontal direction is regulated by a linear portion of the approximately Y-shaped opening, and positioning that enables connection of the connecter provided inside the automatic transmission case and the first connecter to be connected to the connecter is performed. In the center of the approximately V-shaped opening, the protruding portion fits in the opening without looseness. Accordingly, in addition to the effect described in the second aspect, displacement between the connecters in the direction perpendicular to a length direction is therefore eliminated, whereby connection between the connectors can be obtained. Accurate mounting of the unit main body and accurate connection of the connecter can thus be facilitated.

In the automatic transmission control unit according to the fifth aspect, the sealing mechanism portion for sealing the automatic transmission and the unit main body with a packing presses the packing by a flange provided in the unit main body. Accordingly, in addition to the effect described in any one of the first aspect to the fourth aspect, the sealing property between the automatic transmission and the unit main body can be improved.

In the automatic transmission control unit according to the sixth aspect, the sealing mechanism portion presses a packing by a lid body provided as a separate member from the unit main body. When the unit main body of the automatic transmission is attached to the through hole of the automatic transmission, the automatic transmission and the unit main body are sealed by the packing of the sealing mechanism portion and the unit main body will not be subjected to any external force of wires except its own weight. Accordingly, in addition to the effect described in any one of the first aspect to the fourth aspect, the quality will not vary and a uniform sealing property can be ensured by elastic force of the packing.

In the automatic transmission control unit according to the seventh aspect, one of the first connecter and the connecter provided inside the automatic transmission case has a partition wall for insulating connecter male terminals or connecter female terminals of the one connecter from each other, and the other connecter has insertion recesses between connecter female terminals or connecter male terminals of the other connecter so that the partition wall can be inserted into the insertion recesses. Accordingly, in addition to the effect described in any one of the first aspect to sixth aspect, even if the partition wall for insulating the connecter male terminals from each other is provided and the connecter male terminals are broken or bent during connection operation of the connectors, short-circuit between the terminals can be prevented.

Moreover, since the partition wall fits in the insertion recesses, connection between the connecters can be reliably obtained.

In the automatic transmission control unit according to the eighth aspect, the partition wall and the insertion recesses regulate an insertion direction in an early stage of relative connection between the partition wall and the insertion recesses, and the insertion regulation is removed when connection between the connecter female terminals and the connecter male terminals is started. Accordingly, in addition to the effect described in the seventh aspect, connection between the connecter female terminals and the connecter male terminals will not become insufficient due to the insertion regulation of the partition wall and the insertion recesses.

In the automatic transmission control unit according to the ninth aspect, the unit main body has a breather hole in the flange for communicating the inside of the automatic transmission case with the outside of the automatic transmission case. In this case, the inside and outside of the automatic transmission case communicate with each other under any environmental conditions. Accordingly, in addition to the effect described in the sixth aspect or the seventh aspect, pressure adjustment can be performed according to a change in volume of the automatic transmission case caused by a change in environmental temperature. Moreover, dust and the like can be prevented from entering the automatic transmission case.

The automatic transmission according to the tenth aspect includes a speed change mechanism accommodated inside the automatic transmission case, a hydraulic circuit for driving the speed change mechanism, various electronic equipments for controlling a flow of an oil pressure of the hydraulic circuit, and the automatic transmission control unit according to any one of the first aspect to the ninth aspect.

Accordingly, the automatic transmission of the present invention provides the effect described in any one of the fist aspect to the ninth aspect.

DETAILED DESCRIPTION OF THE EXEMPLARY EMBODIMENTS

First Embodiment

Figure 1:
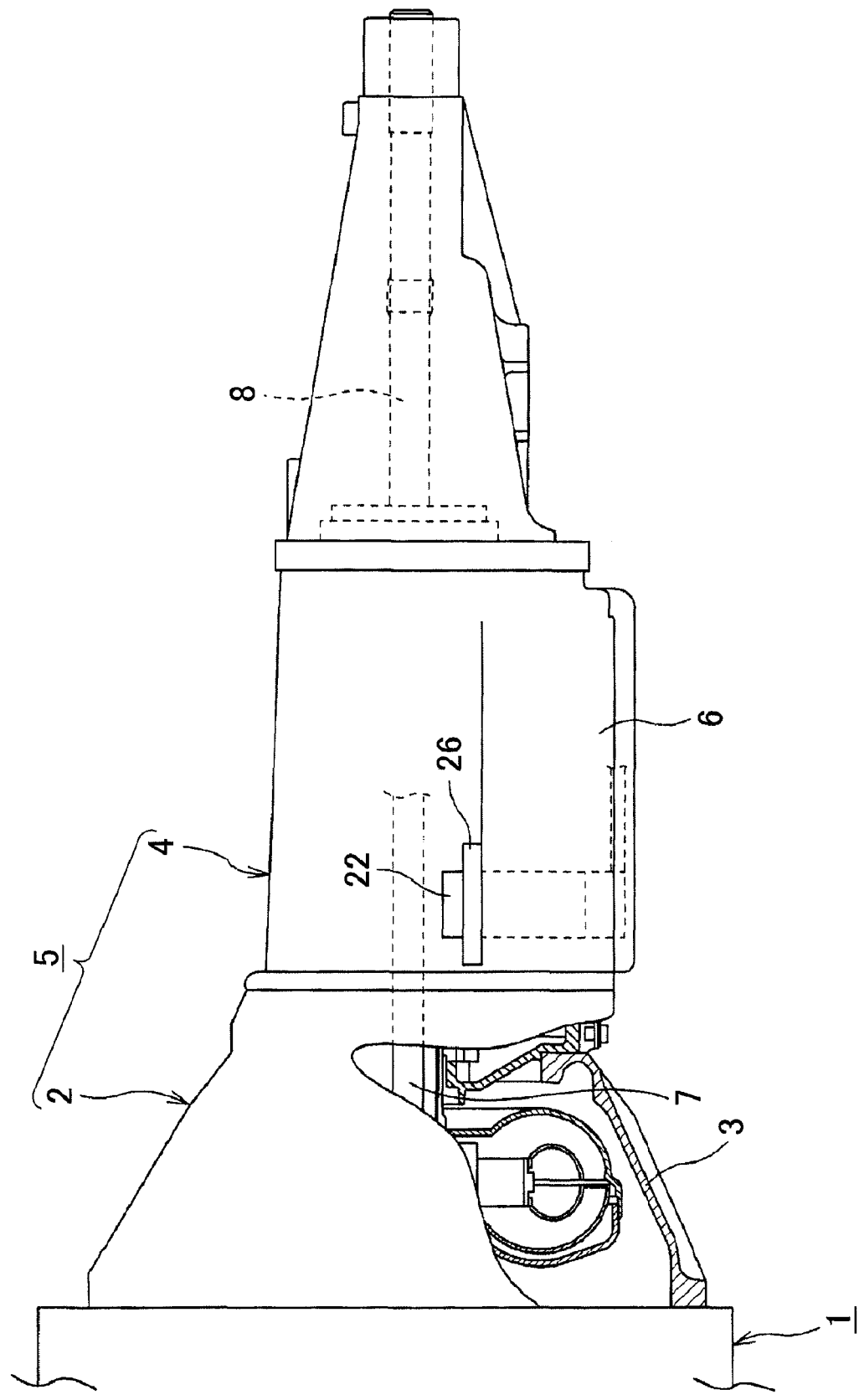
FIG. 1 is a diagram schematically showing the overall structure of a known automatic transmission.

Hereinafter, exemplary embodiments of the present invention will be described based on the accompanying drawings. Note that, in the embodiments, like reference numerals and characters denote like or corresponding functional portions throughout the figures, and overlapping description will be omitted herein.

Figure 2:
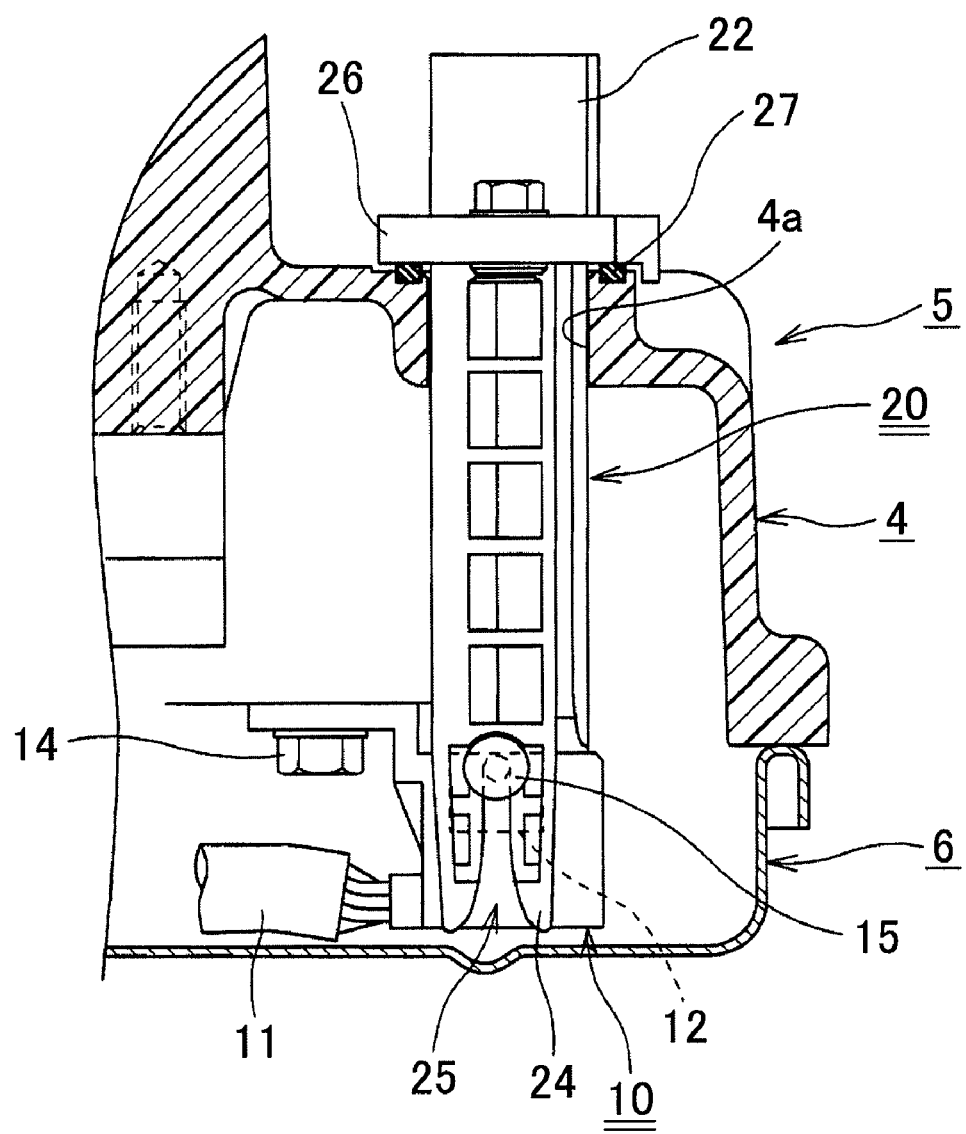
FIG. 2 is a cross-sectional view of a main part of an automatic transmission control unit according to a first embodiment of the present invention and shows a mounted state of the automatic transmission control unit.
Figure 3A:
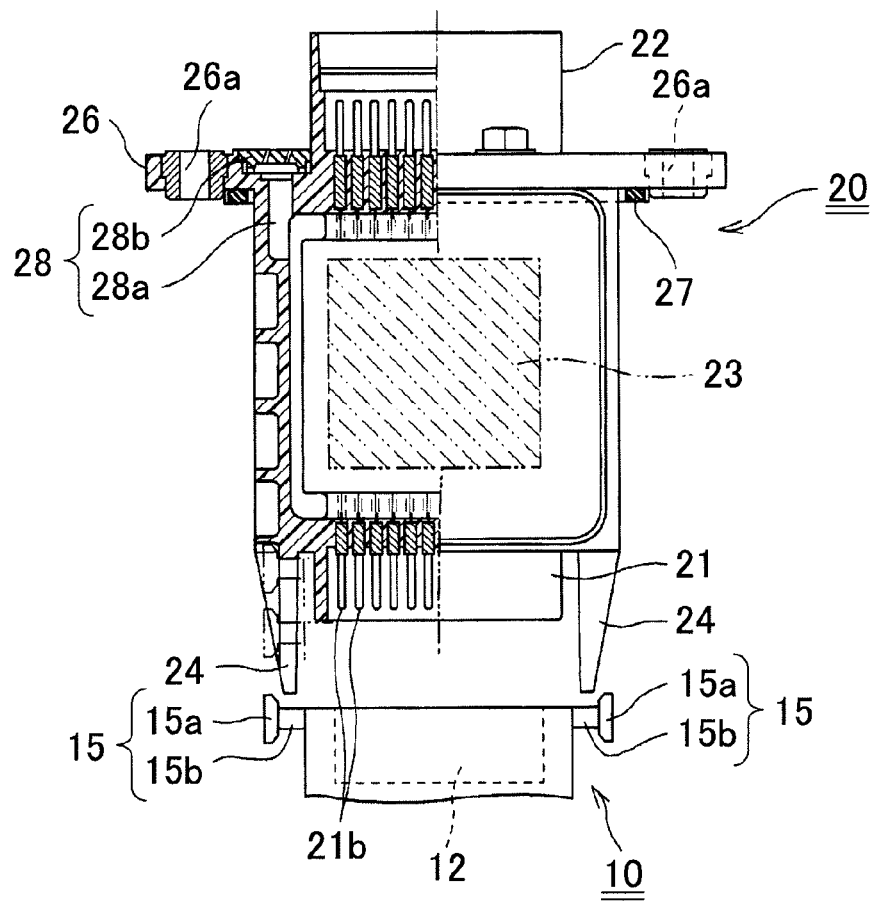
FIG. 3A shows a partial cross-sectional view showing the overall structure of a unit main body in the automatic transmission control unit of the first embodiment of the present invention.
Figure 3B:
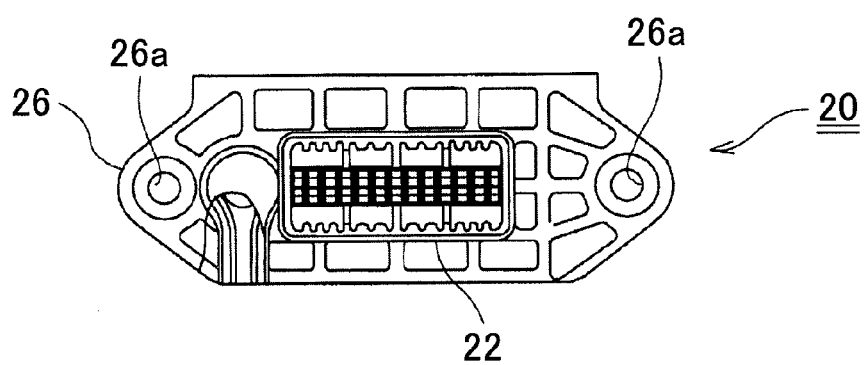
FIG. 3B is a plan view of a connecter included in the automatic transmission control unit of the first embodiment of the present invention and exposed to the outside of an automatic transmission.

FIG. 1 is a diagram schematically showing the overall structure of a known automatic transmission. FIG. 2 is a cross-sectional view of a main part of an automatic transmission control unit according to a first embodiment of the present invention and shows a mounted state of the automatic transmission control unit. FIG. 3A shows a partial cross-sectional view showing the overall structure of a unit main body in the automatic transmission control unit of the first embodiment of the present invention. FIG. 3B is a plan view of a connecter included in the automatic transmission control unit of the first embodiment of the present invention and exposed to the outside of an automatic transmission.

In FIG. 1, a crankshaft is an output shaft of an engine 1 for burning a mixture of fuel injected from an injector and air in a combustion chamber in a cylinder. The crankshaft applies an engine speed and a rotating torque to a torque converter 2 accommodated in a converter housing 3. The torque converter 2 converts the received engine speed and the received rotating torque. An automatic transmission 5 receives an output of the torque converter 2 at an input shaft 7, performs shifting, and then outputs the result from an output shaft 8. The automatic transmission 5 is formed by the torque converter 2 and a speed change mechanism 4, and oil is contained in a space formed by a housing 3 of the torque converter 2, the speed change mechanism 4, and an oil pan 6. The oil is circulated in the automatic transmission 5 by an oil pump included in the automatic transmission 5.

In the automatic transmission control unit of the first embodiment of the present invention, the inside of a case of the automatic transmission 5 means a space surrounded by the torque converter 2 and the speed change mechanism 4 and a space surrounded by the oil pan 6. In the space surrounded by a housing of the automatic transmission 5, the torque converter 2, and the speed change mechanism 4 and the space surrounded by the oil pan 6, a connector 12 is mounted through lead wires 11, which are connected to a control device 23 for performing hydraulic control (see FIG. 3A), an actuator for performing automatic shifting, a solenoid, and various sensors.

More specifically, as shown in FIG. 2, the connector 12 is fixed inside the housing of the automatic transmission 5 by a metal or synthetic resin connector attaching tool 10 by using a bolt 14. As shown in FIG. 3A, protrusions 15 are provided around the connector 12 as a fixed-side guide portion and protrude outward from opposing surfaces of the connector attaching tool 10. Each protrusion 15 is formed by an approximately large-diameter cylindrical head 15a and an approximately small-diameter cylindrical leg 15b. The approximately large-diameter cylindrical head 15a of the protrusion 15 prevents disengagement of the leg 15b fitting in a moving-side guide portion 24 and corrects displacement in a horizontal direction.

The connector 12 formed by connector female terminals is thus disposed in the oil inside the automatic transmission 5, and the protrusions 15 as the fixed-side guide portion are provided around the connecter 12 so as to protrude from the opposing surfaces. In the present embodiment, the connector 12 is attached to the connector attaching tool 10 and the protrusions 15 as the fixed-side guide portion are provided on the opposing surfaces of the connecter attaching tool 10. Each protrusion 15 of the present embodiment is formed by the approximately large-diameter cylindrical head 15a and the approximately small-diameter cylindrical leg 15b. When the present invention is carried out, however, each protrusion 15 may be formed only by the approximately small-diameter cylindrical leg 15b. The shape of the leg 15b is not limited to the small-diameter cylindrical shape, but the leg 15b may have an approximately plate shape, an approximately semi-circular shape in cross section, an approximately elliptical shape in cross section, and the like.

Figure 6:
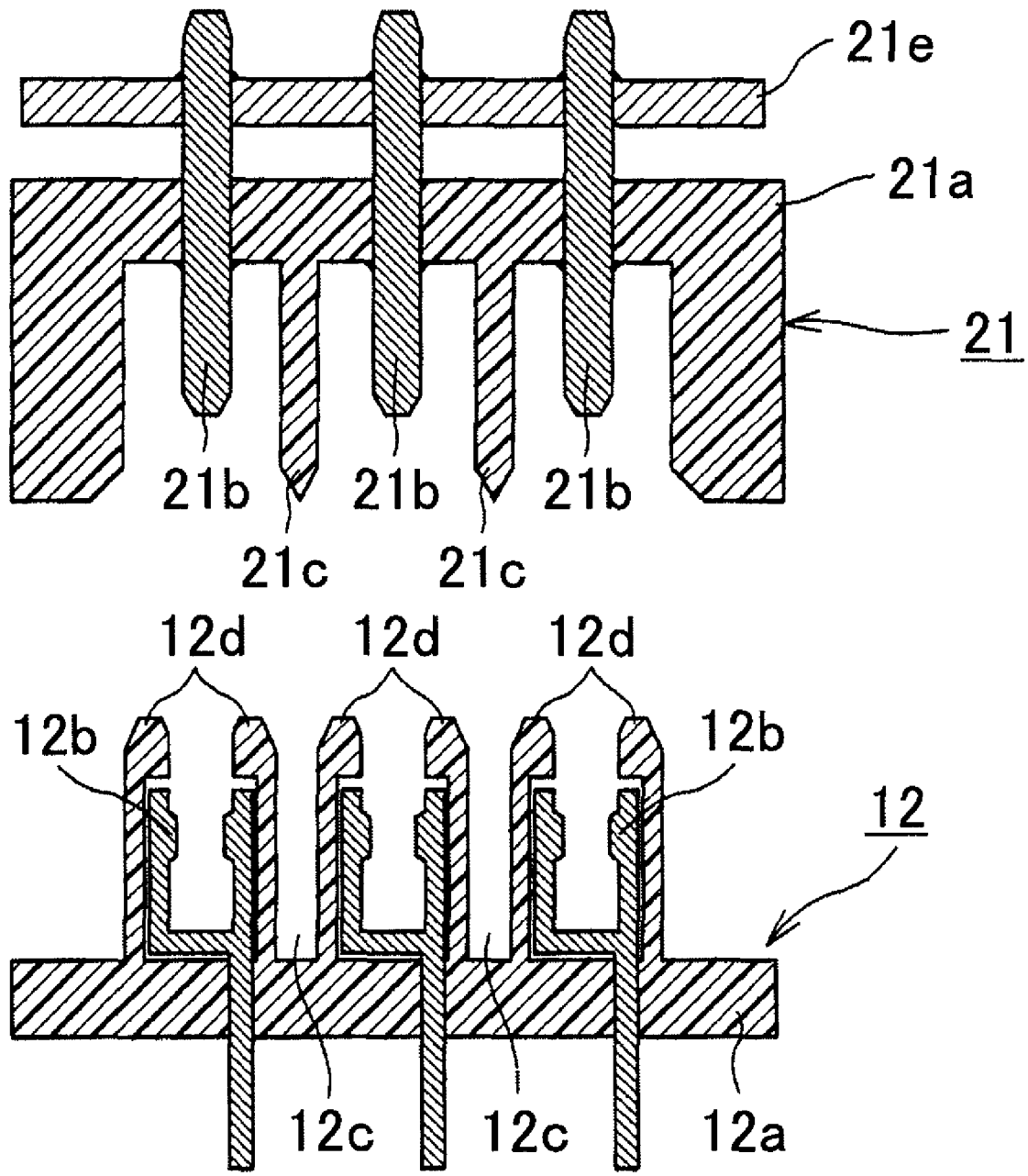
FIG. 6 is an enlarged cross-sectional view showing a main structure of connecters in an automatic transmission control unit according to a fourth embodiment of the present invention.
Figure 7:
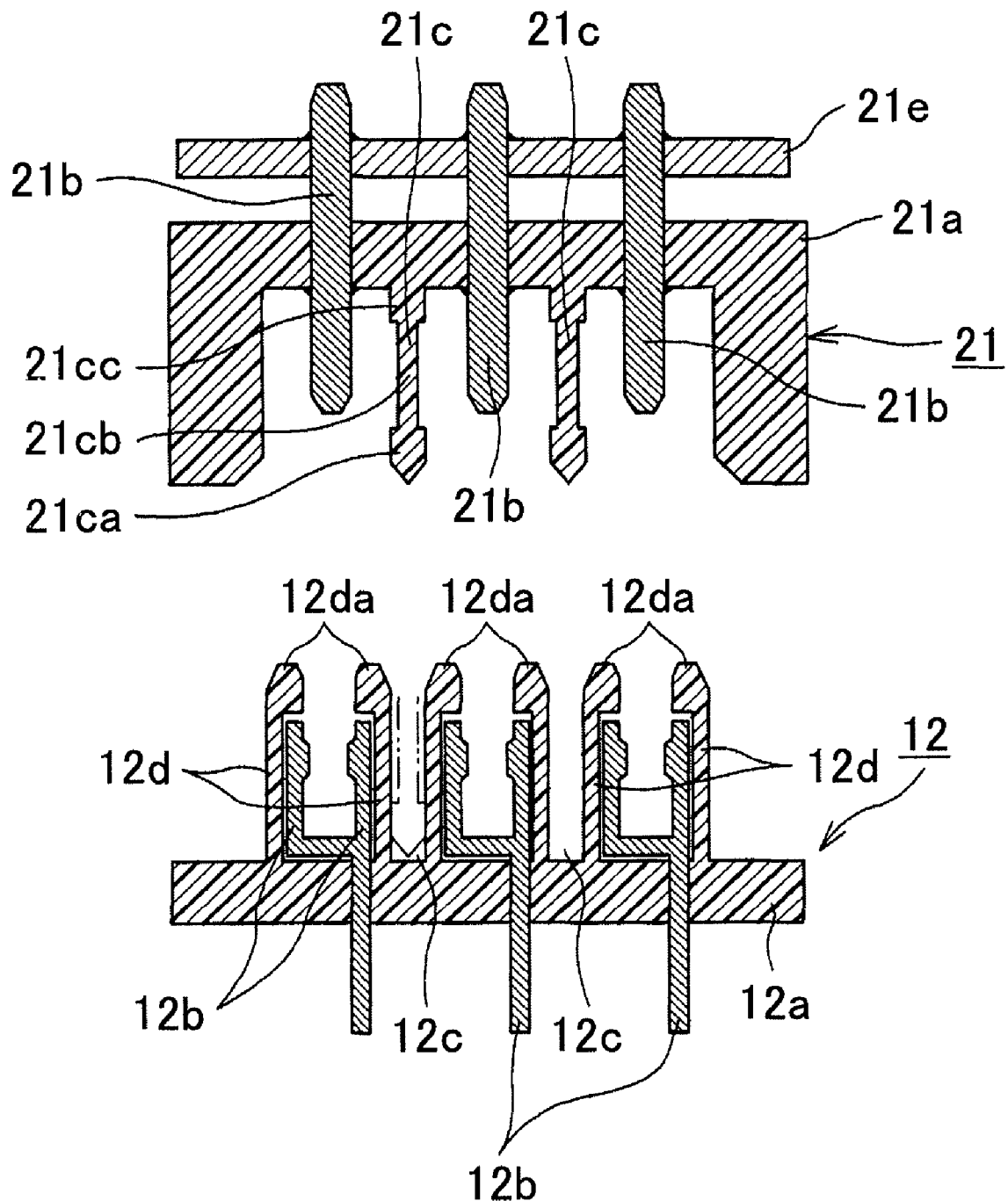
FIG. 7 is an enlarged cross-sectional view showing a main structure of connecters in an automatic transmission control unit according to a fifth embodiment of the present invention.

A metal or synthetic resin unit main body 20 of the present embodiment has a connector 21 at its lower end. As shown in FIGS. 6 and 7, the connector 21 is a first connector of the present embodiment and is formed by connecter male terminals 21b. The connector 21 faces the connector 12 formed by connector female terminals 12b and provided in the oil inside the automatic transmission 5. The unit main body 20 also has a connector 22 at its upper end. The connector 22 is a second connector of the present embodiment and is formed by connector male terminals. The connector 22 is exposed to the outside of the automatic transmission 5. The control device 23 is mounted in the unit main body 20. The control device 23 is formed by a microcomputer and controls the automatic transmission 5.

The moving-side guide portion 24 is formed at lower ends of both sides of the unit main body 20. The moving-side guide portion 24 has an approximately Y-shaped opening 25. An insertion position in the opening 25 is determined by the leg 15b of the protrusion 15. A lower part of the moving-side guide portion 24 is tapered so that the thickness is reduced toward the tip.

The protrusions 15 provided as the fixed-side guide portion in the oil inside the automatic transmission 5, on the other hand, are inserted in the respective approximately Y-shaped openings 25 of the moving-side guide portion 24. By insertion of the unit main body 20, the protrusions 15 are connected deeply into the approximately Y-shaped openings 25. When the protrusions 15 are inserted to the linear part of the approximately Y-shaped openings 25, looseness in the horizontal direction is almost eliminated.

The protrusions 15 as the fixed-side guide portion and the moving-side guide portion 24 function as follows: the fixed side is protruding portions, that is, the legs 15b of the protrusions 15, and the moving side is the moving-side guide portion 24 having the approximately Y-shaped openings 25. By insertion of the unit main body 20, the legs 15b of the protrusions 15 are connected deeply into the V-shaped openings 25. Looseness in the horizontal direction is regulated by the linear part of the approximately Y-shape, whereby positioning is performed for connecting the connector 12 provided inside the automatic transmission 5 and the opposing connector 21. The protrusions 15 as the fixed-side guide portion and the moving-side guide portion 24 therefore function as auxiliary units for connecting the connector 12 provided inside the automatic transmission 5 and the opposing connector 21 to each other. Looseness in the horizontal direction is regulated by insertion of the unit main body 20. Accurate connection between the connector 12 provided inside the automatic transmission 5 and the opposing connector 21 can be obtained by connecting the connectors 12 and 21 after the regulation is applied between the moving-side guide portion 24 and the protrusion 15.

In the present embodiment, the fixed side is the legs 15b of the protrusions 15 and the moving side is the moving-side guide portion 24 having the approximately Y-shaped openings 25. When the present invention is carried out, however, the moving side may be the legs 15b of the protrusions 15 and the fixed side may be the guide having the approximately Y-shaped openings 25. In any case, the fixed-side guide portion and the moving-side guide portion 24 are auxiliary units for connecting the connector 12 provided inside the automatic transmission 5 and the opposing connector 21 to each other. The fixed-side guide portion and the moving-side guide portion 24 can therefore be any guiding units capable of regulating looseness in the horizontal direction by insertion of the unit main body 20 and thus capable of accurately connecting the connector 12 provided inside the automatic transmission 5 and the opposing connector 21 to each other.

As described above, the lower part of the moving-side guide portion 24 is tapered so that the thickness is reduced toward the tip. Therefore, the degree of freedom is high in the early stage of insertion of the unit main body 20. However, when movement of the moving-side guide portion 24 is limited by the legs 15b of the protrusions 15, the moving-side guide portion 24 is moved in the horizontal direction by the heads 15a of the protrusions 15 and thus guided to a desired position.

The connector 22 is mounted at the upper end of the unit main body 20. The connector 22 may be formed by the connector male terminals 21b or the connector female terminals 12b. In the present embodiment, the connector 22 is formed by the connector male terminals 21b (see FIG. 3A) in order to prevent foreign matters from entering the unit main body 20 during transportation of the automatic transmission 5. The connector 22 is mounted in the upper part of the unit main body 20 and the sealing property is maintained by an adhesive or the like.

A flange 26 is formed around the connector 22 in the upper part of the unit main body 20. As shown in FIG. 3B, the diameter of the flange 26 is increased in a direction perpendicular to the insertion direction of the unit main body into the automatic transmission. The flange 26 has a plurality of through holes 26a for bolting and covers a through hole 4a of the automatic transmission 5 from above. The through hole 4a is a hole for inserting the unit main body 20 therein.

More specifically, the unit main body 20 is inserted into the through hole 4a of the automatic transmission 5, and the flange 26 is bolted with a packing 27 interposed between a lower surface of the flange 26 and an upper surface around the through hole 4a of the automatic transmission 5. The sealing property between the automatic transmission 5 and the unit main body 20 can thus be improved. Note that the packing 27 of the present embodiment forms a sealing mechanism portion for sealing the automatic transmission 5 and the unit main body 20.

The flange 26 provided on the unit main body 20 may have any structure as long as the unit main body 20 and the flange 26 are formed integrally. The unit main body 20 and the flange 26 are not necessarily be made of the same material. The unit main body 20 and the flange 26 may be formed by insert-molding a part of the unit main body 20 into the flange 26.

A breather 28 is integrally formed in the unit main body 20. The breather 28 serves as an air flow path that allows the automatic transmission 5, the oil pan 6, and the like to breathe (i.e., receive air) according to a change in internal volume due to a temperature change in the automatic transmission 5, the oil pan 6, and the like. The breather 28 is formed by a breathing path 28a formed in the unit main body 20 and a sealing valve 28b having a plurality of small holes so as to prevent foreign matters from entering from outside.

As described above, the automatic transmission control unit of the present embodiment includes the unit main body 20, the moving-side guide portion 24, and the sealing mechanism portion. The connector 21 facing the connector 12 provided in the oil inside the automatic transmission 5 is provided at the lower end of the unit main body 20 and the connecter 22 exposed to the outside of the automatic transmission 5 is provided at the upper end of the unit main body 20 so as to correspond to the connector 12 provided in the oil inside the automatic transmission 5 and the protrusions 15 as the fixing-side guide portion provided around the connector 12. The control device 23, such as a microcomputer for controlling the automatic transmission 5, is mounted in the unit main body 20. The moving-side guide portion 24 is formed in the lower part of the unit main body 20. The moving-side guide portion 24 is guided by the protrusions 15, i.e., the fixed-side guide portion, provided in the oil inside the automatic transmission 5. Thus, the lower end connector 21 can be connected to the connector 12 provided in the oil inside the automatic transmission 5. The sealing mechanism portion covers from above the whole circumference of the through hole 4a of the automatic transmission 5 for inserting the unit main body 20 therein. The sealing mechanism portion seals the automatic transmission 5 and the unit main body 20 by the packing 27 in order to attach the unit main body 20 to the automatic transmission 5.

As described above and shown in FIG. 3A, in the automatic transmission control unit of the present embodiment, the connector 21, which is connected to the connector 12 provided inside the automatic transmission 5, is provided at the lower end of the unit main body 20, and another connecter 22, which is exposed to the outside of the automatic transmission 5, is provided at the upper end of the unit main body 20. The control device 23 such as a microcomputer for controlling the automatic transmission 5 is mounted in the unit main body 20. The unit main body 20 thus structured is guided by the moving-side guide portion 24 formed in the lower part thereof and the protrusions 15 as the fixing-side guide portion, thereby connecting the lower end connecter 21 to the connector 12. When the unit main body 20 is attached to the automatic transmission 5, the automatic transmission 5 and the unit main body 20 are sealed by the flange 26 and the packing 27 of the sealing mechanism portion. As shown in FIG. 2, the flange 26 covers from above the through hole 4a of the automatic transmission 5 for inserting the unit main body 20 therein.

The connector 22, which is exposed to the outside of the automatic transmission 5, is provided at the upper end of the unit main body 20. Since no wires (such as lead wires) are connected to the unit main body 20, no external force other than its own weight is applied to the unit main body 20. Accordingly, the connector 21 facing the connector 12 provided inside the automatic transmission 5 can be easily mounted. Moreover, the unit main body 20 connects the lower end connecter 21 to the connecter 12 by guiding the connecter 21 with the moving-side guide portion 24 formed in the lower part of the unit main body 20 and the protrusions 15 provided as the fixing-side guide portion inside the automatic transmission 5. This eliminates displacement between the connectors 12, 21 in the direction perpendicular to a length direction, thereby facilitating accurate mounting of the unit main body 20. When the unit main body 20 of the automatic transmission 5 is attached to the through hole 4a of the automatic transmission 5, the unit main body 20 is not subjected to any external force except its own weight, and the automatic transmission 5 and the flange 26 are sealed by the packing 27 as the sealing mechanism portion. Accordingly, the sealing property can be ensured by a uniform elastic force of the packing 27.

By thus mounting the unit main body 20 in the automatic transmission 5 and the oil pan 6, the control device 23 is provided near the hydraulic control device. As a result, the length of signal wires between the control device 23 and the hydraulic control device can be reduced, whereby a communication environment is improved.

Second Embodiment

In the above embodiment, the automatic transmission 5 and the unit main body 20 are sealed by the packing 27 as the sealing mechanism portion and the flange 26. The connecter 22 exposed to the outside of the automatic transmission 5 is provided at the upper end of the unit main body 20 and no wires such as cables and lead wires are connected to the unit main body 20. Since the unit main body 20 is not subjected to any external force except its own weight, the unit main body 20 is not tilted by the external force. Accordingly, the unit main body 20 may alternatively be structured as shown in FIGS. 4 and 5.

Figure 4:
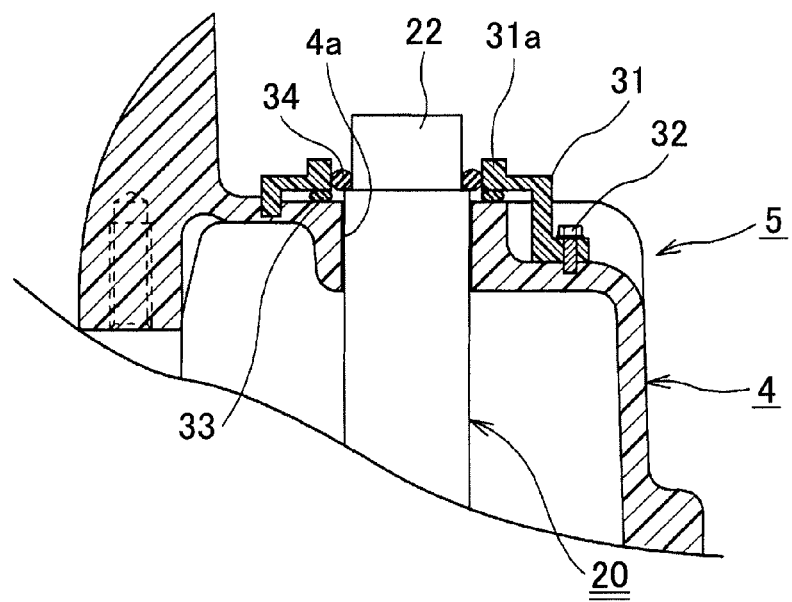
FIG. 4 is a partial cross-sectional view showing a structure of an upper part of a unit main body in an automatic transmission control unit of a second embodiment of the present invention.
Figure 5:
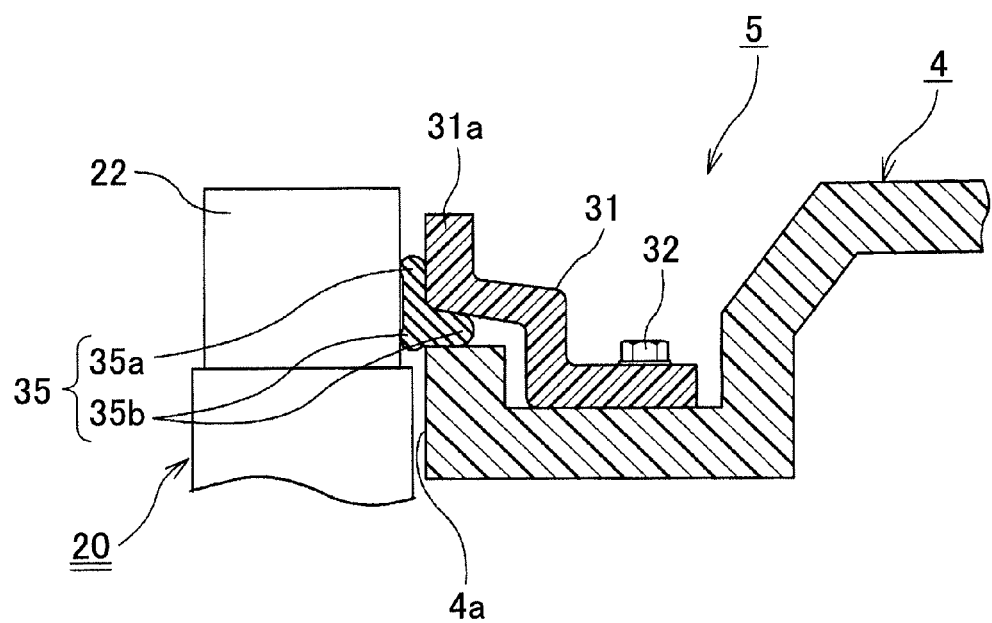
FIG. 5 is a partial cross-sectional view showing a structure of an upper part of a unit main body in an automatic transmission control unit according to a third embodiment of the present invention.

FIG. 4 is a partial cross-sectional view showing a structure of an upper part of a unit main body in an automatic transmission control unit of a second exemplary embodiment of the present invention.

In FIG. 4, a lid body 31 is located above a through hole 4a for inserting a unit main body 20 of an automatic transmission 5 therein, and is fixed by fastening a predetermined number of bolts 32. The automatic transmission 5 and the lid body 31 are sealed by a packing 33 as a sealing mechanism portion. The automatic transmission 5 and the lid body 31 can thus be firmly sealed. Since the unit main body 20 is not subjected to any external force, the sealing property between the lid body 31 and the unit main body 20 can be ensured by a standing portion 31a of the lid body 31 and a uniform elastic force of a packing 34 as the sealing mechanism portion.

Third Embodiment

FIG. 5 is a partial cross-sectional view showing a structure of an upper part of a unit main body in an automatic transmission control unit according to a third exemplary embodiment of the present invention.

In FIG. 5, a lid body 31 is located above a through hole 4a for inserting a unit main body 20 of an automatic transmission 5 therein, and is fixed by fastening a predetermined number of bolts 32. The automatic transmission 5 and the lid body 31 are sealed by a packing 35 as a sealing mechanism portion. In the packing 35 as the sealing mechanism portion, an inner peripheral packing portion 35a and an outer peripheral packing portion 35b of the packing 35 have the functions of the packing 33 and the packing 34 of the embodiment of FIG. 4. The sealing property is thus further improved.

More specifically, the lower surface of a standing portion 31a of the lid body 31 is tapered toward the inside. Accordingly, when the lid body 31 is fastened by the predetermined number of bolts 33, the outer peripheral packing portion 35b flows inward by the fastening force of the lid body 31, whereby the inner peripheral side of the outer peripheral packing portion 35b elastically contacts the side surface of the unit main body 20. Since the inner peripheral packing portion 35a is kept in normal elastic contact with the inner surface of the standing portion 31a of the lid body 31, a perfect sealing state can be obtained. In this embodiment as well, since the unit main body 20 is not subjected to any external force, especially the sealing property between the lid body 31 and the unit main body 20 can be ensured by a uniform elastic force of the packing 35 as the sealing mechanism portion.

Fourth Embodiment

Connection between the connecters 12, 21 and connection between the connecter 22 and a connecter (not shown) as described in the above exemplary embodiments may be structured as follows.

FIG. 6 is an enlarged cross-sectional view showing a main structure of connecters in an automatic transmission control unit according to a fourth embodiment of the present invention. Note that, although the relation between the connecter 12 formed by connecter female terminals 12b and the connecter 21 formed by connecter male terminals 21b is described in the embodiments of FIGS. 6 and 7, this relation is basically common to the relation between the connector 22 and the connecter (not shown).

In FIG. 6, a connecter housing 21a of the connecter 21 has a required number of connecter male terminals 21b embedded therein and is made of an insulating synthetic resin. The connecter housing 21a has a grid-shaped partition wall 21c for isolating the connecter male terminals 21b from each other.

More specifically, when the connecter housing 21a of the connecter 21 is molded, a required number of connecter male terminals 21b are arranged, and the grid-shaped partition wall 21c is formed simultaneously with the connecter housing 21a. Note that a substrate 21e is provided for connection with a control device 23, such as a microcomputer.

A connecter housing 12a of the connecter 12 has a required number of connecter female terminals 12b embedded therein and is made of a synthetic resin insulating material. The connecter housing 12a has insertion recesses 12c between the connecter female terminals 12b so that the grid-shaped partition wall 21c can be inserted into and removed from the insertion recesses 12c. The insertion recesses 12c also insulate the connecter female terminals 12b from each other. The connecter female terminals 12b have an approximately U-shape so as to hold the respective connecter male terminals 21b from both sides. The outside of each connecter female terminal 12b, especially an open-end side of each connecter female terminal 12b, is guided and reinforced by a partition member 12d so that the connecter male terminals 21b can be easily received.

When the connecter housing 12a of the connecter 12 is molded, a required number of connecter female terminals 12b are arranged, and the partition members 12d and the insertion recesses 12c for receiving the grid-shaped partition wall 21c are formed simultaneously with the connecter housing 12a.

Accordingly, when the connecter male terminals 21b of the connecter 21 are mounted to the connecter female terminals 12b of the connecter 12, the grid-shaped partition wall 21c of the connecter 21 first enters the insertion recesses 12c of the connecter 12. The grid-shaped partition wall 21c can be inserted into and removed from the insertion recesses 12c. The connecter female terminals 12b of the connecter 12 are then inserted into the connecter male terminals 21b of the connecter 21. The connecter 21 and the connecter 12 are thus electrically and mechanically connected to each other.

At this time, if the unit main body 20 is moved downward with the connecter male terminals 21b displaced from a correct position, the connecter male terminals 21b may be bent. Even if the connecter male terminals 21b are bent, the grid-shaped partition wall 21c formed between the adjacent connecter male terminals 21b prevents short-circuit from occurring. In this case, metal powder may be included in the oil of the automatic transmission 5 and the oil pan 6. However, since the grid-shaped partition wall 21c increases the distance between the connecter male terminals 21b, short-circuit between electrodes is less likely to occur.

Fifth Embodiment

Stable electrical connection can be maintained by structuring connection between the connectors 12, 21 and connection between the connector 22 and a connecter (not shown) described in the above embodiments as follows.

FIG. 7 is an enlarged cross-sectional view showing a main structure of connecters in an automatic transmission control unit according to a fifth exemplary embodiment of the present invention.

In FIG. 7, a connecter housing 21a of the connecter 21 has a required number of connecter male terminals 21b embedded therein and is made of a synthetic resin insulating material. As in the fourth embodiment, the connecter housing 21a has a grid-shaped partition wall 21c for isolating the connecter male terminals 21b from each other. Tips 21ca and base ends 21cc of the grid-shaped partition wall 21c are provided at the same intervals as insertion recesses 12c of the connecter 12, and middle parts 21cb of the grid-shaped partition wall 21c are thinner than the tips 21ca and the base ends 21cc.

A connecter housing 12a of the connecter 12 has a required number of connecter female terminals 12b embedded therein and is made of a synthetic resin insulating material. As in the fourth embodiment, the connecter housing 12a has insertion recesses 12c between the connecter female terminals 12b so that the grid-shaped partition wall 21c can be inserted into and removed from the insertion recesses 12c. The insertion recesses 12c also insulate the connecter female terminals 12b from each other. Tips 12da of the insertion recesses 12c of partition members 12d of the connecter female terminals 12b are formed so that the width for receiving the tips 21ca of the partition wall 21c becomes approximately the same. When the tips 21ca of the partition wall 21c pass the tips 12da of the partition members 12d, the middle parts 21cb of the grid-shaped partition wall 21c are located between the tips 12da of the insertion recesses 12c of the partition members 12d. The connecter male terminals 21b of the connecter 21 are thus mounted to the connecter female terminals 12b of the connecter 12, whereby the connecters 12, 21 are electrically and mechanically connected to each other.

Accordingly, when the tips 21ca of the partition wall 21c of the connecter 21 are mounted to the connecter female terminals 12b of the connecter 12, the grid-shaped partition 21c of the connecter 21 first enters between the tips 12da of the insertion recesses 12c of the connecter 12. The grid-shaped partition wall 21c can be inserted into and removed from the insertion recesses 12c. The connecter female terminals 12b of the connecter 12 are then inserted around the connecter male terminals 21b of the connecter 21. The tips 21ca of the connecter 21 can thus be electrically and mechanically connected, and the grid-shaped partition wall 21c is not restricted between the tips 12da of the insertion recesses 12c.

In the automatic transmission control unit of the above embodiment, the connector 21 facing the connector 12 provided in the oil inside the automatic transmission 5 is provided at the lower end of the unit main body 20, and another connector 22 exposed to the outside of the automatic transmission 5 is provided at the upper end of the unit main body 20. The control device 23 for controlling the automatic transmission 5 is mounted in the unit main body 20. The unit main body 20 thus structured is guided by the moving-side guide portion 24 formed in the lower part thereof and the protrusions 15 as the fixing-side guide portion, thereby connecting the connecter 21 provided at the lower end of the unit main body 20 to the connecter 12 provided in the oil. When the unit main body 20 is fixed to the automatic transmission 5, the automatic transmission 5 and the unit main body 20 are sealed by the flange 26 and the packing 27 of the sealing mechanism portion. The flange 26 covers from above the through hole 4a for inserting the unit main body 20 therein.

Another connector 22 exposed to the outside of the automatic transmission 5 is provided at the upper end of the unit main body 20. Since no wires such as cables and lead wires are connected to the unit main body 20, no external force other than its own weight is applied to the unit main body 20. Accordingly, the connector 21 facing the connector 12 provided in the oil inside the automatic transmission 5 can be easily mounted. Moreover, the unit main body 20 connects the lower end connector 21 to the connector 12 provided in the oil by guiding the connector 21 with the moving-side guide portion 24 formed in the lower part of the unit main body 20 and the protrusions 15 provided as the fixing-side guide portion in the oil inside the automatic transmission 5. This eliminates displacement between the connectors 12, 21 in the direction perpendicular to a length direction, thereby facilitating accurate mounting of the unit main body 20. When the unit main body 20 of the automatic transmission 5 is attached to the through hole 4a of the automatic transmission 5, the unit main body 20 is not subjected to any external force except its own weight, and the automatic transmission 5 and the unit main body 20 are sealed by the packing 27 as the sealing mechanism portion. Accordingly, the sealing property can be ensured by a uniform elastic force of the packing 27.

The automatic transmission control unit of each embodiment has the unit main body 20, the lower end connector 21 as a first connector, and the upper end connector 22 as a second connector. The unit main body 20 includes the control device 23 for controlling the automatic transmission 5. The lower end connector 21 is connected to an electronic equipment provided inside the case of the automatic transmission 5, and is connected to the connector provided inside the case of the automatic transmission 5. The upper end connector 22 is exposed to the outside of the automatic transmission 5 and is connected to an electronic equipment such as an engine control device for controlling the engine located outside the automatic transmission 5. The lower end connector 21 as the first connector and the upper end connector 22 as the second connector are attached to the unit main body 20 without a wire harness or the like. In each embodiment, at least a part of the automatic transmission control unit is inserted into the through hole 4a formed in the case of the automatic transmission 5, and the automatic transmission control unit and the case of the automatic transmission 5 are sealed by the sealing mechanism portion such as the packing 27.

In the automatic transmission control unit of each embodiment structured as described above, the unit main body 20 includes the control device 23 for controlling the automatic transmission 5, and the lower end connector 21 as the first connector and the upper end connector 22 as the second connector are attached to the unit main body 20. The lower end connector 21 is connected to an electronic equipment provided in the case of the automatic transmission 5 and is connected to the connector 12 provided in the case of the automatic transmission 5. The upper end connector 22 is exposed to the outside of the automatic transmission 5 and is connected to an electronic equipment provided outside the automatic transmission 5. At least a part of the automatic transmission control unit thus structured is inserted into the through hole 4a formed in the case of the automatic transmission 5, and the automatic transmission control unit and the case of the automatic transmission 5 can be sealed by the sealing mechanism portion such as the packing 27.

As described above, the upper end connecter 22 exposed to the outside of the automatic transmission 5 is provided at the upper end of the unit main body 20 as the second connecter. Since no wires such as lead wires are connected to the unit main body 20, the unit main body 20 is not subjected to any external force except its own weight due to deformation of wires such as lead wires. This facilitates mounting of the lower end connecter 21 as the first connecter connected to the connecter provided inside the case of the automatic transmission 5. In other words, conventionally, when the automatic transmission control unit is attached to the automatic transmission 5 of a vehicle body, external force such as horizontal or vertical force is applied by handling of wires. Moreover, the external force applied by the wires hinders fine adjustment of insertion of the lower end connecter 21 into the mating connector 12, whereby connecter pins may be bent. However, the automatic transmission control unit of each of the above embodiments eliminates the possibility that the connecter pins are bent due to the external force. In the attached state as well, appropriate external force is applied to the sealing mechanism portion when the flange 26 is bolted. Uniform sealing is therefore achieved by the sealing mechanism portion. Especially when the unit main body 20 of the automatic transmission 5 is attached to the through hole 4a of the case of the automatic transmission 5, the unit main body 20 is not subjected to any external force except its own weight, and the case of the automatic transmission 5 and the unit main body 20 are sealed by the packing 27 of the sealing mechanism portion. The sealing property can be ensured by the uniform elastic force of the packing 27.

Note that it is herein assumed that the lower end connecter 21 as the first connecter is provided at the lower end and the upper end connecter 22 as the second connecter are provided at the upper end. However, the connecters 21, 22 may be provided on a side surface or may be provided obliquely as long as the connecter 21 is provided in a lower part and the connecter 22 is provided in an upper part.

The phrase "in the oil inside the automatic transmission 5" indicates the inside of the automatic transmission case, and means that the connecter 12 and the fixed-side guide portion are provided in the housing accommodating the oil of the automatic transmission 5 or the oil pan 6. The unit main body 20 may have any structure as long as the unit main body 20 is a housing body made of aluminum, a synthetic resin, or the like and the unit main body 20 includes the control device 23 such as a microcomputer required to control the automatic transmission 5 and performs signal transmission between the control device 23 and other sensors and actuators. Preferably, one of the protrusions 15 as the fixed-side guide portion and the moving-side guide portion 24 is protruding portions, and the other is approximately Y-shaped or approximately V-shaped openings 25. The protrusions 15 as the fixed-side guide portion and the moving-side guide portion 24 may have any structure as long as the protruding portions can be connected deeply into the V-shaped openings by insertion of the unit main body 20, looseness in the horizontal direction can be restricted by the linear part of the approximately Y-shape, and the connecter 12 provided in the oil inside the automatic transmission 5 can be connected with the opposing connecter 21. The sealing mechanism portion covering from above the through hole 4a for inserting the unit main body 20 of the automatic transmission 5 therein may have any structure as long as the sealing mechanism portion covers from above the through hole 4a of the automatic transmission 5 and no external force is applied to the unit main body 20.

In the automatic transmission control unit of the above embodiments, one of the protrusions 15 as the fixed-side guide portion and the moving-side guide portion 24 is protruding portions, and the other is approximately Y-shaped openings 25. The protruding portions are connected deeply into the approximately V-shaped openings 25 by insertion of the unit main body 20, and looseness in the horizontal direction is regulated by the linear part of the approximately Y-shape. Especially in the linear part of the approximately Y-shape, the protruding portions fit in the openings without looseness. Displacement between the connecters in the direction perpendicular to a length direction is therefore eliminated, thereby facilitating accurate mounting of the unit main body 20.

The protrusions 15 as the fixed-side guide portion and the moving-side guide portion 24 may have any structure as long as looseness in the horizontal direction can be regulated by deeply connecting the protrusions 15 and the moving-side guide portion 24 and the protrusions 15 as the fixed-side guide portion and the moving-side guide portion 24 can eventually cause connection between the connecter 12 provided in the oil inside the automatic transmission 5 and the opposing connecter 21 of the unit main body 20.

In the automatic transmission control unit of the above embodiments, one of the protrusions 15 as the fixed-side guide portion and the moving-side guide portion 24 is protruding portions, and the other is approximately Y-shaped openings 25. By insertion of the unit main body 20, the protruding portions are connected deeply into the approximately Y-shaped openings 25, looseness in the horizontal direction is regulated, and positioning for connecting the connecter 12 provided in the oil inside the automatic transmission 5 and the opposing connecter 21 is performed. Accordingly, in the center of the approximately V-shaped openings 25, the protruding portions fit in the openings without looseness. Displacement between the connecters in the direction perpendicular to a length direction is therefore eliminated, whereby connection between the connecters can be obtained. Accurate mounting of the unit main body 20 and accurate connection of the connecter 21 can thus be facilitated.

One of the protrusions 15 as the fixed-side guide portion and the moving-side guide portion 24 is protruding portions, and the other is approximately Y-shaped openings 25. By insertion of the unit main body 20, the protruding portions are connected deeply into the approximately V-shaped openings 25, looseness in the horizontal direction is eliminated in the linear part of the approximately Y-shape, and positioning for connecting the connecter 12 provided in the oil inside the automatic transmission 5 and the opposing connecter 21 is performed. In other words, the protrusions 15 as the fixed-side guide portion and the moving-side guide portion 24 are auxiliary units for connecting the connecter 12 provided in the oil inside the automatic transmission 5 and the opposing connecter 21. Therefore, the protrusions 15 as the fixed-side guide portion and the moving-side guide portion 24 may have any structure as long as looseness in the horizontal direction can be minimized by insertion of the unit main body 20 and the connecter 12 provided in the oil inside the automatic transmission 5 and the opposing connecter 21 can be connected accurately.

In the automatic transmission control unit of the above embodiments, the sealing mechanism portion for sealing with the packing 27 is structured so that the packing 27 is pressed by the flange 26 provided on the unit main body 20. The sealing property between the automatic transmission 5 and the unit main body 20 can therefore be improved. The flange 26 provided on the unit main body 20 may have any structure as long as the unit main body 20 and the flange 26 are formed integrally. The unit main body 20 and the flange 26 are not necessarily be made of the same material. A part of the unit main body 20 may be insert-molded into the flange 26.

The sealing mechanism portion of the automatic transmission control unit of the above embodiments is structured so that the packing 33, 34, 35 (see FIGS. 4 and 5) are pressed by the lid body 31 made of a separate member from the unit main body 20. Accordingly, when the unit main body 20 of the automatic transmission 5 is attached to the through hole 4*a* of the automatic transmission 5, the automatic transmission 5 and the unit main body 20 are sealed by the packing 33, 34, 35 of the sealing mechanism portion and the unit main body 20 will not be subjected to any external force of wires except its own weight. As a result, the quality will not vary and the sealing property can be ensured by uniform elastic force of the packing 33, 34, 35.

The lid body 31 provided on the unit main body 20 of the exemplary embodiments is not formed integrally with the unit main body 20. When the present invention is carried out, the lid body 31 may be structured so that the sealing property can be ensured by a plurality of members.

In the automatic transmission control of the above embodiments, one of the connecter 12 provided in the oil inside the automatic transmission 5 and the opposing connecter 21 has the partition wall 21*c* for insulating the connector male terminals 21*b* or the connector female terminals 12*b* from each other, and the other connecter has the insertion recesses 12*c* provided between the connector female terminals 12*b* or between the connector male terminals 21*b*.

As described above, one of the connecter 12 provided in the oil inside the automatic transmission 5 and the opposing connecter 21 has the partition wall 21*c* for insulating the connecter male terminals 21*b* or the connecter female terminals 12*b* from each other and the other connecter has the insertion recesses 12*c* provided between the connector female terminals 12*b* or between the connecter male terminals 21*b* to insert the partition wall 21*c* therein. Therefore, even if the partition wall 21*c* for insulating the connecter male terminals 21*b* or the connecter female terminals 12*b* from each other is provided and the connecter male terminals 21*b* or the connecter female terminals 12*b* are bent during connection operation of the connecters, short-circuit between the terminals can be prevented. Moreover, connection between the connecters can be reliably implemented by fitting the partition wall 21*c* into the insertion recesses 12*c*.

In the automatic transmission control unit of the above embodiments, one connector can have the partition wall 21*c* for insulating the connector male terminals 21*b* or the connecter female terminals 12*b* from each other, for example, the partition wall 21*c* for insulating the connector male terminals 21*b* from each other, and the other connector can have the insertion recesses 12*c* provided between the connector female terminals 12*b* to insert the partition wall 21*c* therein. The partition wall 21*c* may have a grid shape or may have a cut in a part of the side that is less bendable. However, the partition wall 21*c* preferably has a grid shape on the connecter male terminal 21*b* side or the connecter female terminal 12*b* side.

In the automatic transmission control unit of the above embodiments, the partition wall 21*c* and the insertion recesses 12*c* regulate the insertion direction in the early stage of relative connection between the partition wall 21*c* and the insertion recesses 12*c*. Regulation of insertion is removed when connection between the connecter female terminals 12*b* and the connecter male terminals 21*b* is started. Therefore, connection between the connecter female terminals 12*b* and the connecter male terminals 21*b* will not become insufficient due to the insertion regulation of the partition wall 21*c* and the insertion recesses 12*c*.

The partition wall 21*c* and the insertion recesses 12*c* may have any structure as long as the partition wall 21*c* and the insertion recesses 12*c* can accurately connect the connecter 12 provided in the oil inside the automatic transmission 5 to the opposing connecter 21 and can prevent adjacent connecter female terminals 12*b* or adjacent connecter male terminals 21*b* from contacting each other even if the connecter female terminals 12*b* or the connecter male terminals 21*b* are broken by insertion of the unit main body 20.

The speed change mechanism 4 accommodated in the housing 3 of the automatic transmission case, a hydraulic circuit (not shown) for driving the speed change mechanism 4, various electronic equipments for controlling a flow of an oil pressure of the hydraulic circuit, and the automatic transmission control unit of the present embodiment form the automatic transmission of the present invention. The automatic transmission of the present embodiment therefore has the functions and effects of the automatic transmission control unit of each embodiment.

What is claimed is:

1. An automatic transmission control unit that comprises:
    a unit main body including a control unit, which is built in the unit main body, for controlling an automatic transmission;
    a first connecter connected to an electronic equipment inside an automatic transmission case and connected to an inside connecter provided inside the automatic transmission case, the first connecter extends from the unit main body and includes a connecter body and terminals;
    a second connecter exposed to outside of the automatic transmission case and connected to an electronic equipment provided outside the automatic transmission case, wherein the first connecter and the second connecter are directly attached to the unit main body, wherein
    at least a part of the automatic transmission control unit is inserted into a through hole formed in the automatic transmission case, and the automatic transmission control unit and the automatic transmission case are sealed by a sealing mechanism portion; and
    a moving-side guide portion that extends from the unit main body, and the moving-side guide portion is guided by a fixed-side guide portion provided in the oil inside the automatic transmission case and guides the first connecter to the connecter provided inside the automatic transmission case so that the first connecter can be connected to the connecter;
    wherein the moving-side guide portion and the first connector are discrete structures, the moving-side guide portion extending from the unit main body beyond the first connector.

2. The automatic transmission control unit according to claim 1, wherein
    one of the fixed-side guide portion and the moving-side guide portion is a protruding portion, the other is an approximately Y-shaped opening,
    by insertion of the unit main body, the protruding portion is connected into the approximately Y-shaped opening, and looseness in a horizontal direction is regulated by a linear portion of the approximately Y-shaped opening.

3. The automatic transmission control unit according to claim 2, wherein
    the sealing mechanism portion seals the automatic transmission case and the unit main body with a packing by using a flange provided in the unit main body.

4. The automatic transmission control unit according to claim 2, wherein
the sealing mechanism portion presses a packing by a lid body provided as a separate member from the unit main body, and seals the automatic transmission case and the unit main body with the packing.

5. The automatic transmission control unit according to claim 4, wherein
the unit main body has a breather hole in the flange for communicating the inside of the automatic transmission case with the outside of the automatic transmission case.

6. An automatic transmission comprising:
the automatic transmission case including the fixed-side guide portion;
a speed change mechanism accommodated inside the automatic transmission case, a hydraulic circuit for driving the speed change mechanism,
various electronic equipments for controlling a flow of an oil pressure of the hydraulic circuit, and
the automatic transmission control unit according to claim 5.

7. The automatic transmission control unit according to claim 2, wherein
one of the first connecter connecting to the connecter provided inside the automatic transmission case and the connecter provided inside the automatic transmission case has a partition wall for insulating connecter male terminals of the one connecter from each other, and the other connecter has insertion recesses between connecter female terminals of the other connecter so that the partition wall can be inserted into the insertion recesses.

8. The automatic transmission control unit according to claim 7, wherein
the partition wall and the insertion recesses regulate an insertion direction in an early stage of relative connection between the partition wall and the insertion recesses, and the insertion regulation is removed when connection between the connecter female terminals and the connecter male terminals is started.

9. The automatic transmission control unit according to claim 1, wherein
one of the fixed-side guide portion and the moving-side guide portion is a protruding portion, the other is an approximately Y-shaped opening,
by insertion of the unit main body, the protruding portion is connected into the approximately Y-shaped opening, looseness in a horizontal direction is regulated by a linear portion of the approximately Y-shaped opening, and positioning that enables connection of the connecter provided inside the automatic transmission case and the first connecter to be connected to the connecter is performed.

10. The automatic transmission control unit according to claim 1, wherein
the sealing mechanism portion seals the automatic transmission case and the unit main body with a packing by using a flange provided in the unit main body.

11. The automatic transmission control unit according to claim 1, wherein
the sealing mechanism portion presses a packing by a lid body provided as a separate member from the unit main body, and seals the automatic transmission case and the unit main body with the packing.

12. The automatic transmission control unit according to claim 1, wherein
one of the first connecter connecting to the connecter provided inside the automatic transmission case and the connecter provided inside the automatic transmission case has a partition wall for insulating connecter male terminals of the one connecter from each other, and the other connecter has insertion recesses between connecter female terminals of the other connecter so that the partition wall can be inserted into the insertion recesses.

13. The automatic transmission control unit according to claim 12, wherein
the partition wall and the insertion recesses regulate an insertion direction in an early stage of relative connection between the partition wall and the insertion recesses, and the insertion regulation is removed when connection between the connecter female terminals and the connecter male terminals is started.

14. An automatic transmission comprising:
the automatic transmission case including the fixed-side guide portion,
a speed change mechanism accommodated inside the automatic transmission case,
a hydraulic circuit for driving the speed change mechanism,
various electronic equipments for controlling a flow of an oil pressure of the hydraulic circuit, and
the automatic transmission control unit according to claim 1.

* * * * *